(No Model.)

G. E. WHITEHEAD.
Screw Tap.

No. 242,173.  Patented May 31, 1881.

WITNESSES,

W. H. Thurston.
J. Knight.

INVENTOR,

George E. Whitehead

UNITED STATES PATENT OFFICE.

GEORGE E. WHITEHEAD, OF PROVIDENCE, RHODE ISLAND, ASSIGNOR TO THE PROVIDENCE TOOL COMPANY, OF SAME PLACE.

SCREW-TAP.

SPECIFICATION forming part of Letters Patent No. 242,173, dated May 31, 1881.

Application filed March 7, 1881. (No model.)

*To all whom it may concern:*

Be it known that I, GEORGE E. WHITEHEAD, of the city and county of Providence, and State of Rhode Island, have invented a new and useful Improvement in Screw-Taps; and I do hereby declare that the following specification, taken in connection with the accompanying drawings, forming a part of the same, is a full, clear, and exact description thereof.

My invention relates to a tap for producing screw-threads in nuts, &c.; and my improvement consists in a novel construction of the tap, so that its threaded portion can be expanded and contracted for the purpose of producing a slightly larger or smaller thread.

It is often necessary that the diameter of the thread produced by a tap should be slightly varied from a standard size in order that the hole tapped by it may fit a definite screw. It is also desirable that a tap should be constructed so that its threaded portion can be expanded when the tap becomes slightly worn, to bring said threaded portion to exact gage. These results I secure by making the threaded portion of the tap adjustable, as will hereinafter appear.

Figure 1:
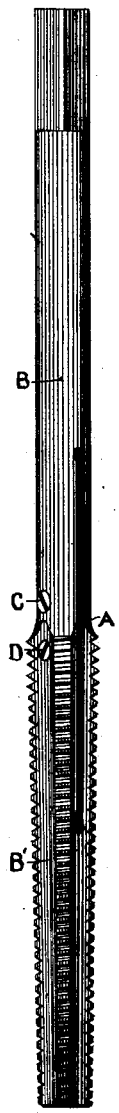
Figure 2:
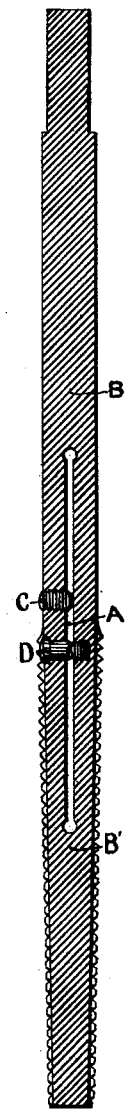

Referring to the drawings, Figure 1 represents my improved tap in elevation, and Fig. 2 shows the same in longitudinal section.

As shown in both figures of the drawings, the tap is provided with a slot, A, extending from the shank portion B into the threaded portion B', thereby securing elasticity to the heel of said threaded portion. For expanding the tap a screw, C, is provided, which is threaded into one-half of the tap and takes bearing against the opposite wall of the slot A, as shown in Fig. 2. This screw also prevents the tap from springing. For contracting the tap a screw, D, is provided, which is threaded into one half of the tap and has a head bearing in the other half. The action of each screw is opposed to the other. Therefore by proper manipulation the threaded portion of the tap may be expanded or contracted within certain limits, and held firmly to the desired gage.

In place of the screws C and D, other equivalent mechanical devices may be substituted to perform the same office, in combination with the longitudinal slot A.

I am aware that heretofore reamers have been bifurcated—that is, made open-ended, or constructed with two spring-legs which can be contracted or expanded by suitable means—instances of the same being shown in United States Letters Patent No. 182,496 and No. 225,265. I do not claim, therefore, anything covered by said patents.

For practical use it is necessary that a tap should always start the thread to be cut at the same gage, and that any variation in the diameter of its threaded portion should only be at and near the part which finishes the thread. My improved tap answers these requirements, since it has a solid threaded end, and only that portion of the tap which finishes the thread is adjustable.

Having described my invention, what I claim, and desire to secure by Letter Patents, is—

A solid-ended screw-tap provided with a longitudinal slot, A, and a screw or screws for varying the diameter of the finishing portion thereof and holding the same to a definite gage, substantially as set forth.

GEORGE E. WHITEHEAD.

Witnesses:
W. H. THURSTON,
J. KNIGHT.